June 24, 1930.  J. W. LYNCH  1,766,135
APPARATUS FOR BLOWING THIN WALL GLASSWARE
Filed Aug. 28, 1926  5 Sheets-Sheet 3
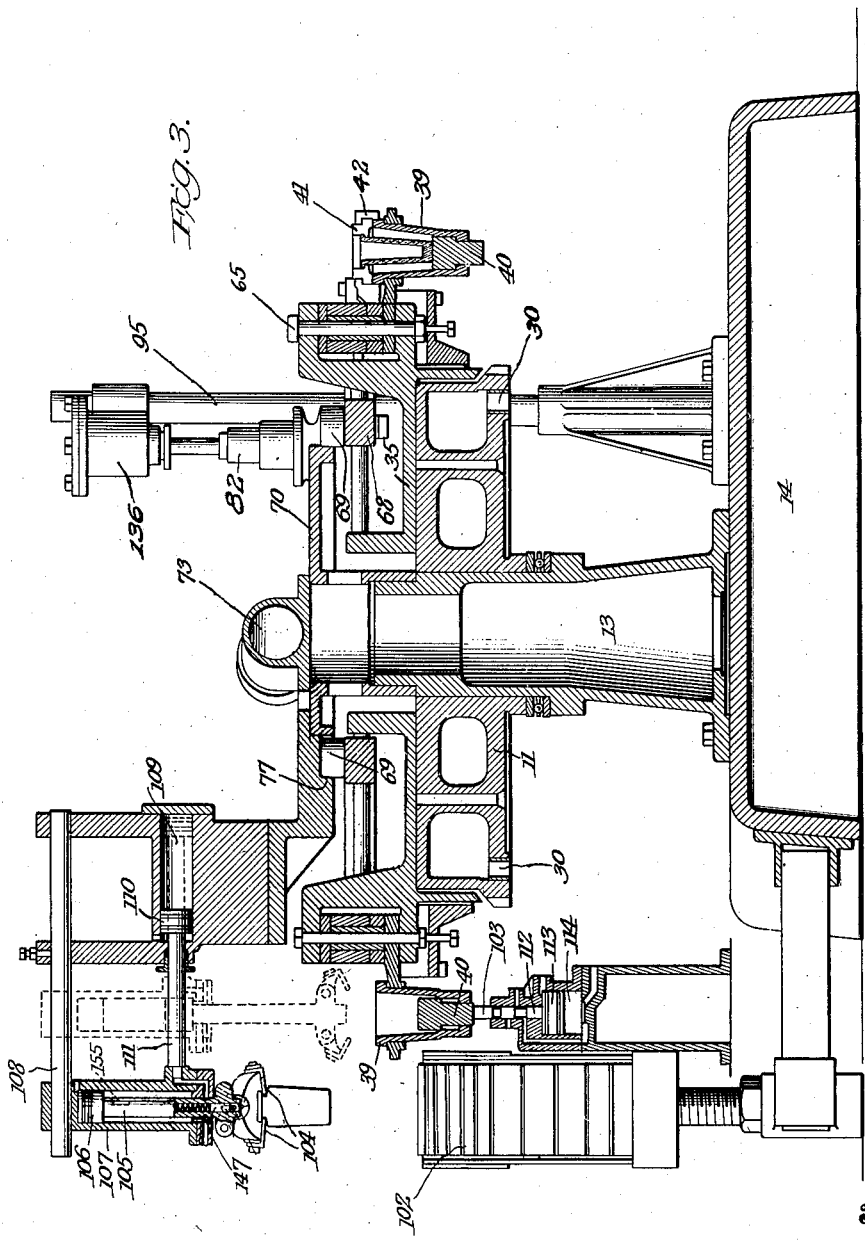
Inventor
James W. Lynch
By Emery, Booth, Janney & Varney
his Attorneys

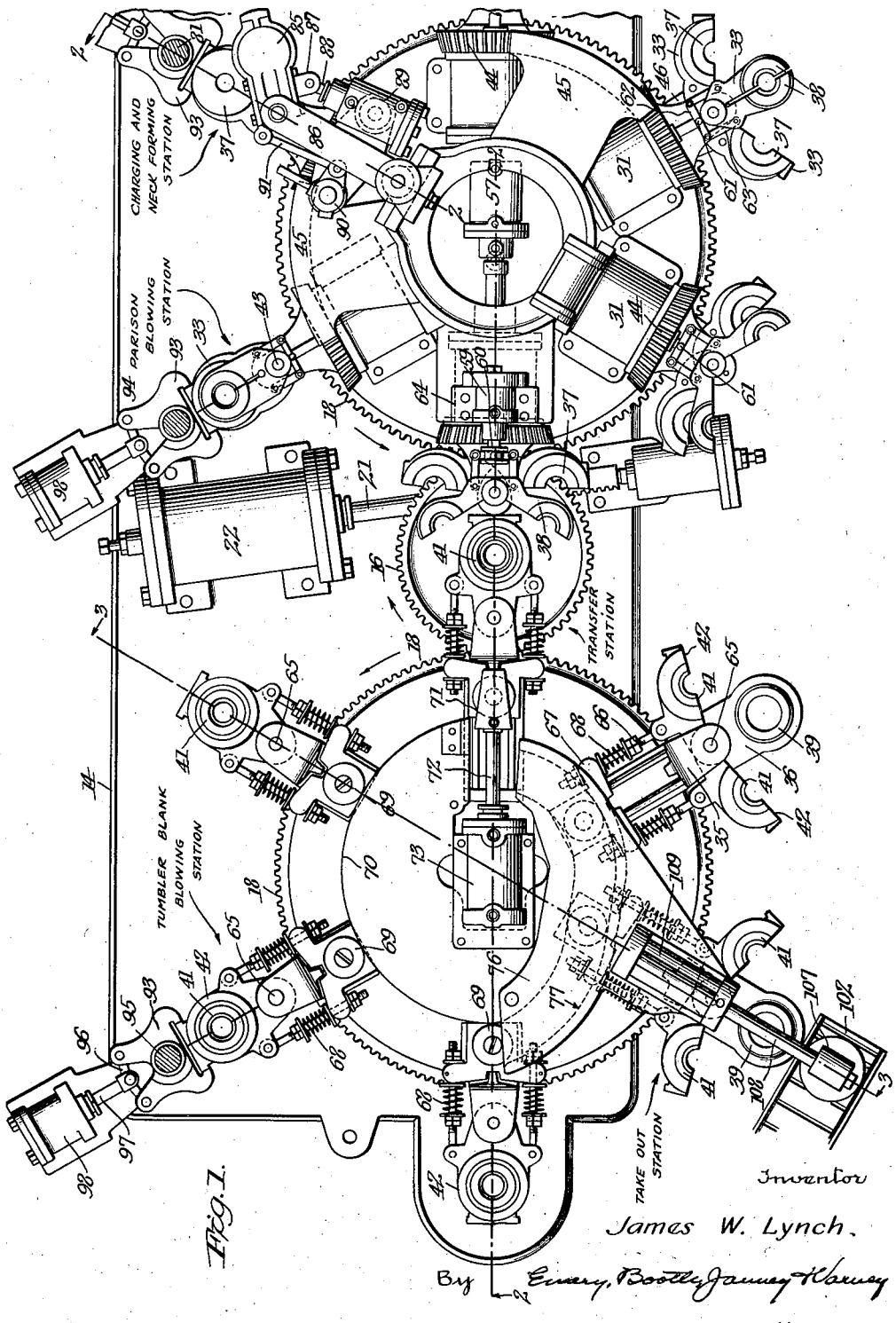

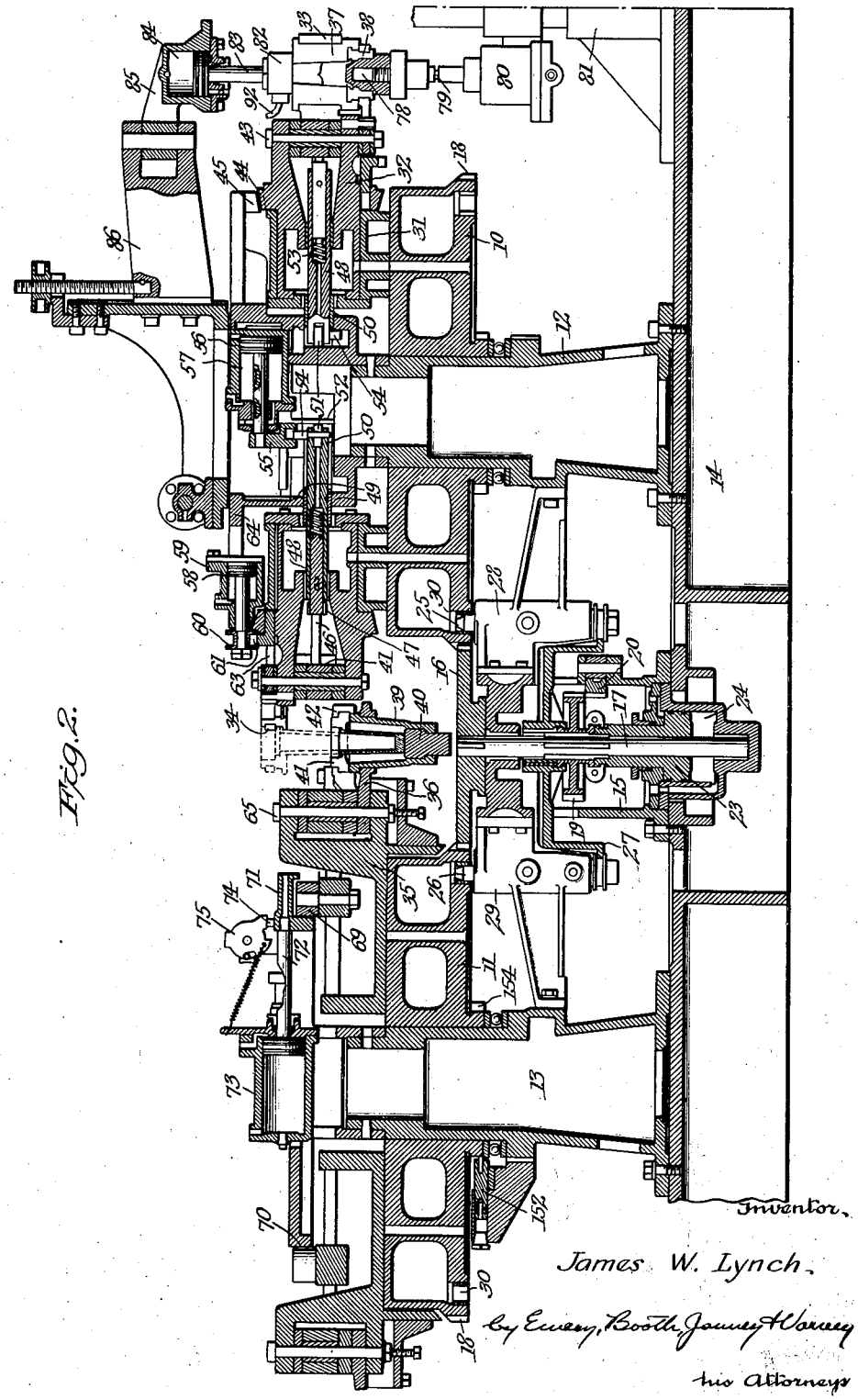

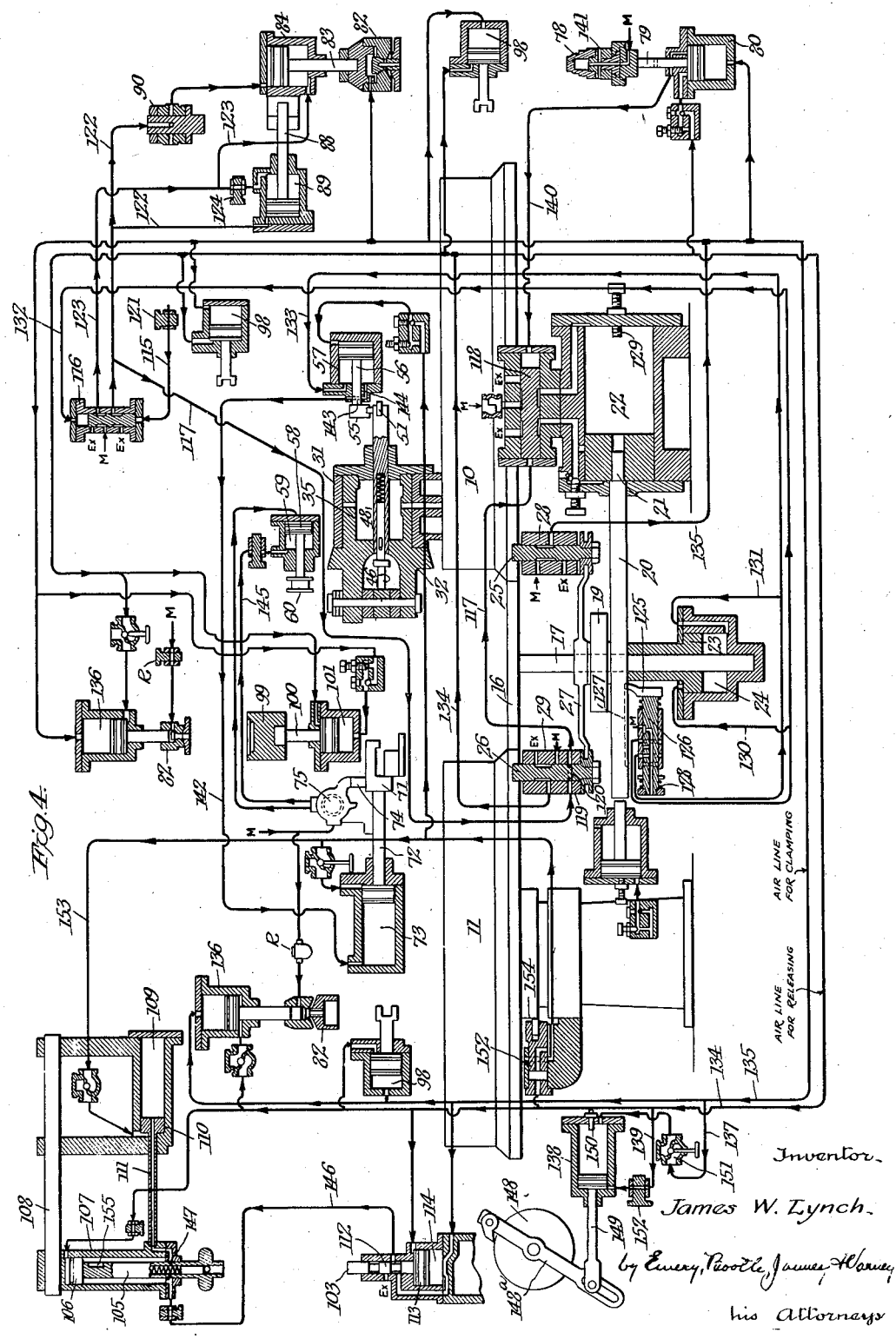

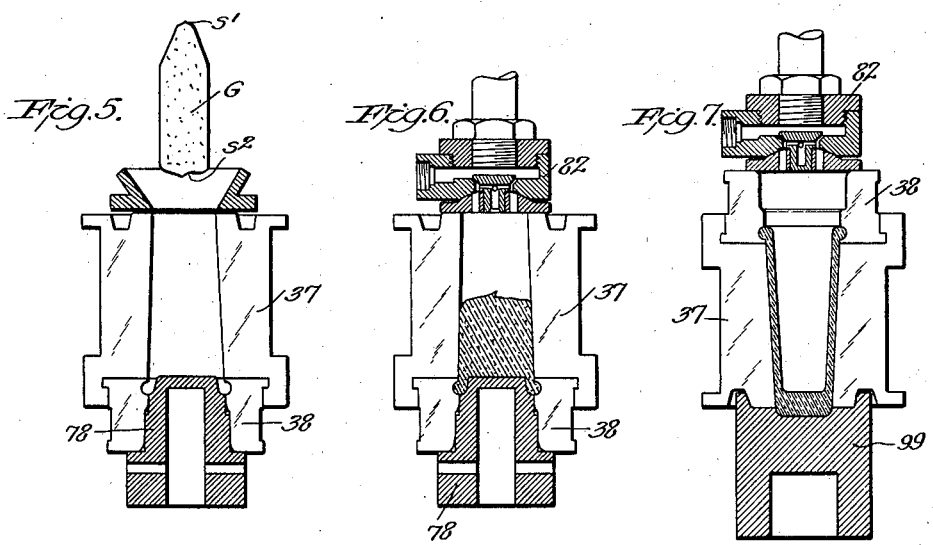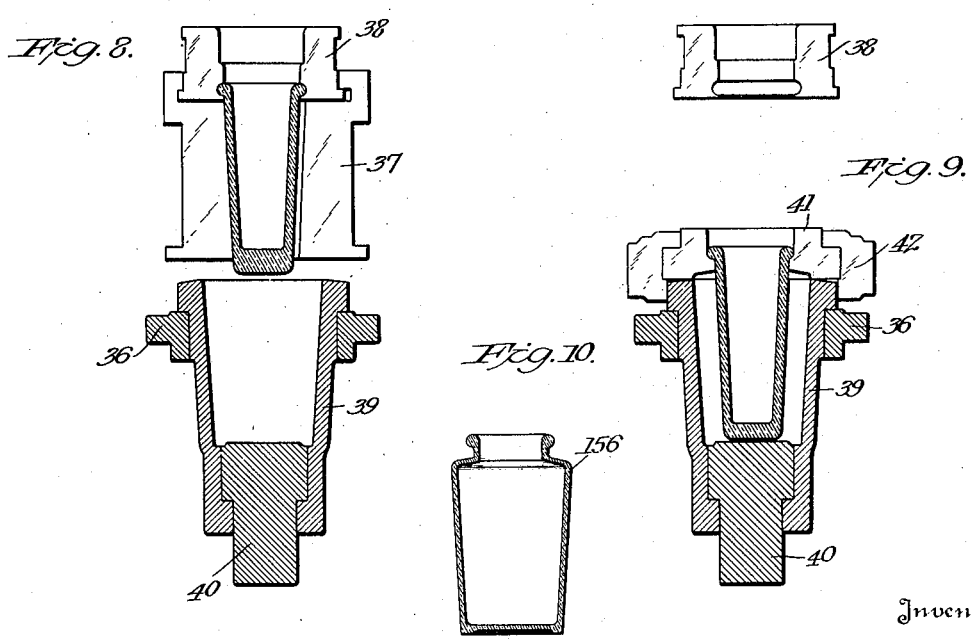

Patented June 24, 1930

1,766,135

UNITED STATES PATENT OFFICE

JAMES W. LYNCH, OF ANDERSON, INDIANA, ASSIGNOR, BY MESNE ASSIGNMENTS, TO LYNCH GLASS MACHINE COMPANY, A CORPORATION OF INDIANA

APPARATUS FOR BLOWING THIN-WALL GLASSWARE

Application filed August 28, 1926. Serial No. 132,266.

This invention relates to the automatic production of thin walled glass ware, as for instance, tumblers, jars, and the like, and comprises improvements in the methods and machines for producing such articles of a superior quality.

Heretofore, it has been the practice, in the manufacture of tumblers and like ware, by automatic machines, to charge an open ended blank mold with a gob of glass of suitable size, and to press it into shape for blowing by means of a press plunger movable into the mold from above. Such molds are usually provided with a movable bottom piece or "valve" adapted to lift the pressed blank partly from the mold to facilitate removal therefrom for blowing in another mold. The finished ware produced by such methods and machines is objectionable because of a circular ring or score in the bottom of the ware made by the edge of the bottom valve of the press mold. In many instances it has been customary to press or blow a design, such as a "star" or "rising sun" in the bottom of the ware to conceal these defective marks.

Furthermore, when such prior automatic pressing and blowing machines have been used in conjunction with automatic glass feeding devices, the lower end of each gob (which is the upper part of the cut made during the preceding charging operation) is sufficiently cooled or chilled so as to prevent removal of the marks left by the cutting tool in the shaping of the tumbler, and these marks, called "shear marks" are discernible in the finished ware.

The primary objects of my invention are to provide a method of forming tumblers and like ware automatically, to produce more perfect ware than has hitherto been possible by automatic means, and to adapt and improve the machines hitherto in use for practicing the new method.

Further objects of the invention appear in connection with the description of the method and machine shown in the accompanying drawings, illustrating one embodiment of my invention, wherein:

Fig. 1 is a plan view of the machine;
Fig. 2 is a longitudinal sectional view taken partly on the principal axis and partly on the line 2—2 of Fig. 1;

Fig. 3 is a sectional view taken on the line 3—3 of Fig. 1;

Fig. 4 is a diagrammatic view showing the air lines and valves for actuating and controlling the various operating parts of the machine;

Figs. 5 to 9, inclusive, are detail views illustrating various steps in forming the ware according to my new method, showing the positions of the various mold sections at charging, neck finishing, blank forming, transferring and ready for blowing positions, respectively; and Fig. 10 is a view of the finished tumbler blank prior to cracking off the neck portion.

In the drawings the invention is illustrated in connection with an automatic or semi-automatic glassware forming machine of the general type shown and described in the application for patent filed by me jointly with Edward G. Bridges, Serial No. 172,678, filed June 4, 1917, and the invention is advantageously applied to and with machines of such type, although capable of use generally in connection with glassware finishing machines.

Machines of the type referred to are well known to the trade as Lynch "narrow neck" machines, and the parts of which shown in Figs. 1, 2 and 3, and diagrammed in Fig. 4, are deemed sufficient to illustrate the working of my invention and the relationship of my present improvements thereto. Such machines comprise two mold carrying tables, which rotate simultaneously, the molten glass being fed to the machine in the form of gobs G (see Fig. 5) and shaped by means of air pressure into "blanks" or parisons in the molds on the first or blank forming table, and thence being transferred to the finishing molds on the second or blow table, and blown to the shape of a tumbler blank (see Fig. 10). The finished ware may be removed from the finishing molds by suitable take-out means and deposited on a conveyor. The different groups of mechanism, all operating automatically, are actuated and coordinated by air lines controlled by suitable valves. In order that an adequate understanding of the invention may be had, it is described in connection with the construction and operation of the illustrative machine, but it is not restricted to the machine described. For convenience the machine will be considered and described as composed of the following groups of mechanisms, viz: tables and table turning mechanism; blank mold and neck ring actuating devices; blow mold and "bust-off" ring actuating devices; parison forming means and blowing devices; and take-out device and conveyor.

*Tables and table turning mechanism*

Referring to Figs. 1 and 2, the machine comprises two circular tables 10, 11, hereinafter designated blank mold and blow mold tables, respectively, mounted for rotation on pedestals 12, 13, which are supported on a base 14. In order to bring the blanks successively to the several operating positions, or stations (see Fig. 1) the tables are caused to turn intermittently in unison in the direction of the arrows in Fig. 1, by means of a gear 16, which is mounted on a vertical shaft 17 journaled in a pedestal 15 arranged between the tables, and which meshes with gear teeth 18 formed around the lower edges of the tables. The shaft 17 is rotated intermittently by means of a splined gear 19 which periodically engages with a rack 20 on a piston rod 21 working in a horizontal cylinder 22 supported on the base. The gear 19 is movable up and down by means of a hollow piston 23 operating in a vertical cylinder 24 which surrounds and supports the lower end of the shaft 17 (see Fig. 2). Upward movement of the piston 23 raises the gear 19 and disengages it from the rack 20 and also locks the tables 10, 11, by means of locking pins 25, 26, to which it is connected by a forked double armed swivel 27. The pins are slidably supported in housings or brackets 28, 29, which connect the pedestals 12, 13 and 15. The upper ends of the pins engage in spaced sockets 30 in the under side of the tables in radial alinement with the mold positions. Downward movement of the piston 23 lowers the gear 19, causing it to engage with the rack 20, and also disengages the locking pins from the tables to permit them to turn.

*Blank mold and neck ring actuating devices*

The blank mold table 10 is provided with six journals or brackets 31 for supporting the hollow shafts or carriers 32 (see Figs. 1 and 2) for the two part blank mold holders 33 and neck ring holders 34; and the blow mold table 11 is provided with six brackets 35 for supporting the blow mold holders 36 which are provided with rings that project radially beyond the table adapted to hold the solid blow molds. The blank molds 37 and neck rings 38 therefor, and the blow molds 39 and bottom valves 40 therefor, and divided top or "bust-off" mold sections 41 for the blow molds, are shaped to suit each different size and style of article, in conformity with well understood practice. The "bust-off" mold sections or rings are mounted in carrier arms 42, pivoted on the brackets 35 by any suitable means.

The blank mold holders 33 and neck ring holders 34 are hinged to open and close on the vertical pins 43 (see Fig. 2) which are mounted in the outer ends of the hollow shafts or cylinders 32 to turn therewith. Twice during each revolution of the blank mold table these hollow shafts are caused to rotate one-half turn by any suitable means to invert the blank molds at the proper times for charging and blowing the blank; and the blank mold holders (and thereby the blank molds and neck rings) are held closed during these movements.

In the machine illustrated, the hollow shafts 32 are provided with bevel gears 44 which periodically engage one or the other of two curved racks or gear segments 45, the length of these segments being just enough to cause the gears 44 to roll through one-half a revolution as the hollow shafts swing past them. Any suitable means may be provided for opening and closing the blank molds and neck molds, that illustrated comprising links 46 and yokes 47, which have stems mounted to slide in the hollow plungers 48 (see Fig. 2) and which in turn are mounted to slide in and turn with the hollow shafts 32. The hollow shafts 32 are prevented from turning over at the respective operating stations and in the transfer position by the upper and lower guides 49 on the pedestal 12 between which their squared inner ends 50 slide. The plungers 48 are operated by rollers 51 on their inner ends which engage the stationary cam 52 on the pedestal 12. Springs 53 in the hollow plungers maintain the blank holders normally in closed position.

At the transfer position air operated means are provided for opening the blank mold holders 33 and neck ring holders 34 in proper sequence as hereinafter described. For this purpose the inner ends of the plungers 48 (see Fig. 2) are fitted with studs 54 which at the transfer position project in the path of a radially movable finger 55 carried by a piston rod and piston 56 mounted in a cylinder 57 on the top of the pedestal 12. At the proper time the piston 56, working in the cylinder 57, withdraws the finger and stud in engagement therewith to pull back the plunger 48 and open the blank mold holders 33 as they reach the transfer position.

Similarly the neck ring holders 34 are opened by a piston 58 working in the cylinder 59 at the proper time to release the blank or parison (see Fig. 2). The piston has a forked actuator 60 on its outer end which is adapted for engagement with the stud 61 on the yoke 62, which operates the neck ring holders through the links 63. The cylinder 59 and piston 58 are mounted on the bracket 64 over the path of movement of the blank mold carriers, and the yokes 62 are slidably mounted in the hollow shafts 32, respectively, so as to present the studs 61 uppermost in the transfer position.

*Blow mold and "bust-off" ring actuating devices*

The upper or "bust-off" portion of the respective blow molds (see Figs. 1 and 2) in the machine illustrated is made in a divided ring, the ring sections 41 being mounted in arms 42 that are hinged in pairs on the respective vertical pins 65 carried in the brackets 35 and in alinement with the blow molds and blank molds at the transfer station. The "bust-off" rings are opened and closed by means of the links 66 connected to the sliding yokes 67 and are normally held closed by the springs 68. The yokes 67 are actuated by cam rollers 69 to open and close the bust-off rings to receive and discharge the ware as hereinafter described. The rollers 69 engage a stationary cam 70 mounted on the pedestal 13 to hold the molds closed during the first half of the revolution of the table 11 from the transfer station. The bust-off sections or rings 41 are open when they reach the transfer station, and following the opening of the blank molds 37 they are closed by air operated means, to surround the lower end of the blank, which is suspended during the interim by the neck rings 38 (as indicated in dotted lines in Fig. 2). The bust-off rings closing means preferably comprises a fork 71 secured to the radially movable piston rod 72 and arranged in the path of the cam rollers 69 to embrace a roller as the table stops with bust-off rings open at the transfer station. The piston rod 72 works in a cylinder 73, suitably disposed and mounted on the pedestal 13, and controlled so as to be actuated upon the opening of the blank mold at the transfer position to close the bust-off rings beneath and around the blank, ready to receive it when dropped from the neck rings as hereinafter described. The piston rod 72 also carries a stud 74 for actuating the oscillating valve 75 to admit air to the neck ring operating cylinder 59 to open the neck rings after the blow mold sections have closed around the blank, as hereinafter described in connection with the operation of the machine.

The bust-off rings 41 are opened to free them from the blown ware and permit the latter to cool more rapidly after leaving the cooling station by means of a cam 76 (see Figs. 1 and 2) which, in the form shown, is secured to the stationary cam 70 and has a depending roller track 77 engaging the outer side of the rollers 69 and extending between the cooling station and the transfer station. The cam track 77 is formed so as to complete the opening movement of the bust-off rings at the take-out station. The track member 77 is substantially concentric with the axis of the table 11 from the take-out to the transfer station so that the rings will come up to the transfer station opened.

*Parison forming means and blowing devices*

At the charging station (see Figs. 1 and 2) the blank molds 37 and neck rings 38 are inverted, and the neck ring opening is closed by the neck pin 78 which is mounted on the upper end of a piston rod 79, reciprocable to lift and lower the neck pin by means of a cylinder 80 adjustably secured upon a standard 81 fixed to the base 14 of the machine.

Above the molds in the charging position is the blow head 82 for the initial blow down, to pack the glass around the neck pin. The blow head 82 is vertically and laterally movable to uncover the open end of the molds to permit charging of the glass, and is supported on the lower end of a piston rod 83 which operates in a cylinder 84 mounted on the outer end of a swinging arm 85 pivoted to the overhanging bracket 86. The arm 85 is caused to oscillate by means of a link 87 connected to a piston rod 88 operating in a cylinder 89 swiveled on the bracket 86. An oscillating valve 90, carried on the bracket 86 and connected to the arm 85 by a link 91, controls the air pressure for operating the cylinder 84 to lower the blow head 82, as hereinafter described. In the normal position of the machine, the blow down device is swung away from the blank mold (see Fig. 1) but after the gob of glass G has been fed into the mold, the arm 85 is swung over the mold and the blow head 82 is lowered to cover and seal the open end of the mold, and air admitted thereto through a flexible pipe 92 leading to a suitable source of air pressure (see Fig. 4).

The blank molds 37 and bust-off rings 41 are securely held closed at the blowing stations by clamping jaws 93 which engage lugs on the blank mold holders and bust-off ring holders. The clamping jaws 93 are pivoted on the support 81 at the charging station and suitable supports 94, 95, at the parison blowing and finishing blowing stations, respectively, and are actuated by means of toggles 96 connected to piston rods 97 working in the respective cylinders 98, as illustrated in Fig. 1. At the parison blowing station a baffle plate 99 is provided for closing the open bottom end of the blank mold 37, and is raised and lowered by means of the piston rod 100 in a suitable cylinder 101 (see Fig. 4).

Any suitable type of blow head 82 (see Fig. 7) may be used for blowing the parison and tumbler blank; and as many blow heads may be supplied, one at each blowing station, as found desirable. The pressure of the air for blowing may be adjusted by means of suitable regulating valves R (see Fig. 4) for each blow head independently to suit differences in the ware or in the operating conditions.

*Take-out device and conveyor*

The take-out device (see Figs. 1 and 3) for transferring the ware to the conveyor 102 consists of a lifting pin 103 partly to elevate the ware in the molds, and a combined gripping and lifting device and laterally moving device to remove the partly elevated ware from the blow molds and deposit it on the conveyor.

The gripping, lifting and laterally moving device illustrated herein is similar to that shown and claimed in my Patent No. 1,561,451, granted to me November 10, 1925, to which reference is made for a detail description of the device and its mode of operation. Briefly stated, however, it comprises ware gripping tongs or members 104 pivoted to a piston rod 105 carried by piston 106 reciprocable in a vertically disposed cylinder 107. This assembly of gripper, piston and cylinder, is slidably mounted upon a suitable support or guideway 108, which also supports a horizontally disposed cylinder 109 within which is reciprocably mounted a piston 110 having a hollow piston rod 111 connected to the cylinder 107.

When the blow mold is at rest at the take-out station the bottom valve 40 is directly above the valve lifting pin 103 carried by a piston rod 112 having a piston 113 working in a cylinder 114. The operation of the piston 113 is timed to operate in synchronism with the table rotating and locking device, to lift the blown ware partially out of the body portion 39 of the blow mold in position to be grasped by the take-out tongs 104. The piston 112 is grooved to constitute a valve for controlling the movement of the gripping, lifting and laterally moving device, as hereinafter described.

*Operation*

In the diagram, Fig. 4, the machine is shown with the valves and moving parts in their normal position of rest, ready to receive a charge of glass, the tables being locked and air pressure on the mold clamping lines and blow heads. Upon delivery of a charge of glass to the blank forming mold, the timing device of the machine feeder, or the punty valve if the machine is fed by hand, admits air to the pipe 115 (see upper right hand corner of Fig. 4) and thereby the control valve 116 is shifted to admit air from the main M to the pipe 117 leading to the main power cylinder valve 118 to shift it to the right from the position shown in Fig. 4. This air must pass through the port 119 in the housing 29 for the locking pin 26 for the blow table, which registers with a groove 120 around the pin when the latter is in locking position. Hence, if for any reason the locking pins should not be seated in their sockets in the tables, as would happen if the tables had not completed their turning movement or if the tables had become jammed for any cause, the air pressure to the main power cylinder valve 118 will be shut off and the machine will not start, thus preventing starting of the machine prematurely. A stop cock 121 is provided to shut off the pipe 115 to prevent the actuation of the blowing machine if desired.

Movement of the main control valve 116 to admit air to throw the main power cylinder valve also admits air to the branched pipe 122 which actuates the blow down. One branch of the pipe 122 leads to the head end of the blowhead oscillating cylinder 89 to swing the blowhead over the mold position, and the other branch leads through the rotary valve 90 to the head end of the blowhead cylinder 84. Upon completion of the swinging movement of the blowhead arm 85, the rotary valve 90 opens the air passage to the blowhead cylinder, and the latter lowers the blow-head into contact with the open end of the blank mold 37, as shown in Fig. 6. The reversal of the main control valve 116 opens the air lines 117 and 122 to the atmosphere and permits them to exhaust. It also admits air to the pipe 123 which leads to the outer end of oscillating cylinder 89 and lower end of blowhead cylinder 84 to raise the blowhead and swing it away from over the blank molds, as shown in Fig. 1. The speed of operation of the oscillating cylinder 89 may be controlled by a valve 124 in the air pipe 123 leading to it.

Movement of the main power cylinder valve 118 to the right as shown in Fig. 4 will admit air from the pressure main M to the left hand end of the table rotating cylinder 22 and return the piston and rack 20 secured thereto to position for engagement with the gear 19 for rotating the tables. As the rack approaches the end of its return movement it will move the finger 125 on the table control valve 126 to shift the latter to the right. This finger engages in a slot 127 on the under side of the rack which is a little shorter than the movement of the rack so that the finger 125 and the valve 126 are moved to right and left just before the end of the movement of the rack in the corresponding direction. Springs 128 between the valve 126 and ends of the valve casing enable the valve to over travel a little at each end of its stroke without detriment, and an adjustable screw 129 in the head end of the cylinder 22 limits the travel of the piston at the head end of the stroke and positions it so the gear 19 may drop into mesh with the rack 20 without difficulty when the control valve 126 operates to lower the gear shifting piston 23 and unlock the tables. The gear shifting piston 23 is moved by air admitted to the cylinder 24 from the table control valve 126 through the air lines 130 and 131, movement of the control valve by the return of the piston in the cylinder 22 at the end of its return stroke as hereinbefore described causing admission of air from the pressure main M to the line 130 and simultaneously opening the pipe 131 to the atmosphere, for lowering the gear into mesh and unlocking the moving parts of the machine preparatory to the table rotating movement; and vice versa at the end of the table rotating movement.

A branch 132 of the air line 130 leads to one end of the main control valve 116 for resetting it ready for the next charging movement of the machine feeder. A branch 133 of the air line 131 leads to the outer end of the cylinder 57 for opening the blank molds and initiating the transfer of the parison to the blow molds, as hereinafter described.

The operation of the cylinder 24 to lower the hollow piston 23 and splined gear 19 to engage the rack 20 and at the same time withdraw the locking pins 25 and 26 from the tables, effects the admission of air from the pressure main M through the housing 29 surrounding the locking pin 26 to the air line 134 for releasing the mold clamps and blowheads, and simultaneously opens the air line 135 to the atmosphere through the housing 28 surrounding the locking pin 25.

The pipe 134 has branches leading to the cylinders that actuate the various forming tools and blowheads (excepting the blow down head) on the blank forming and blowing tables to relieve and withdraw them from contact with the molds, such as the blank and blow mold clamping cylinders 98, the neck pin cylinder 80 and baffle cylinder 101, and the blowhead actuating cylinders 136, thereby freeing the molds and permitting the tables to be turned to carry the molds to their succeeding operating stations. This pipe 134 also has branches leading to the upper end of cylinder 107 of the take-out device for depositing the blown tumbler blank on the conveyor, and to the upper end of cylinder 114 for lowering the lifting pin 103; and a branch 137 leads to the cylinder 138 for operating the conveyor 102 through a suitable ratchet and pawl mechanism. A branch 139 from the air line 134 returns the conveyor operating piston at the end of the table rotating movement.

Part of the air admitted by the locking pin valve 29 to the pipe 134, after passing through the neck pin actuating cylinder 80 to withdraw the neck pin from the blank mold in the charging position, is utilized to reset the main power cylinder valve 118, to which it is returned through the pipe 140 when the neck pin is fully withdrawn and the groove 141 in its stem registers with the ports alining with the pipe 140. The pipe 140 leads to the right hand end of the main valve 118 (as shown in Fig. 4) to throw the valve to the left (i. e. back to normal position) and thereby admit air from the pressure main M to the right hand end of the table rotating cylinder 22 as shown in Fig. 4. Thereupon the piston and piston rod 21 will be moved to the left to actuate the rack 20 and gears 19 and 16 to rotate the tables through the angle of 60°, and thereby shift each blank mold and blow mold from one operating station to the next.

Upon the completion of a table turning movement of the rack 20, the table control valve 126 will be shifted to the left (as shown in Fig. 4) to admit air from the pressure main M to the pipe 131 and to open the pipe 130 to the atmosphere. This will raise the piston 23, withdraw the splined gear 19 from the rack 20, and lift the locking pins 25 and 26 to lock the tables. Part of the air admitted to the pipe 131 at the end of the turning movement of the table rotating cylinder passes through the branch 133 and actuates the blank mold opening cylinder 57 and the air passing through this cylinder at the end of the opening movement is led through the air pipe 142 to operate the cylinder 73 and actuate the closing mechanism for the bust-off rings. This is effected by a groove 143 in the piston rod 56 (see Fig. 4) coming into register with a passage 144 in the cylinder 57 to permit the air from pipe 133 to pass through pipe 142 to the rear end of cylinder 73 for actuating the bust-off ring closing mechanism. The stud 74 on the fork 71 of the bust-off ring closing mechanism engages the oscillating valve 75, which is adjustably mounted on the supporting bracket, so that at the end of the bust-off ring closing stroke it operates to admit air from the main air line M through the pipe 145 leading to the outer end of the neck ring opening cylinder 59 to open the neck rings and release the parison. By changing the position of the valve 75 so that it may be engaged earlier or later in the stroke of the piston rod 72, the time of dropping the parison may be controlled.

Shifting the locking pins to lock the tables opens the pipe 134 to the atmosphere through the valve 29, and also admits air from the pressure main through the valve 28 to the pipe 135, thereby actuating the mold clamps and blowheads to engage the molds and perform the several forming and blowing operations, as will be understood by those familiar with machines of the same general type now in use. When the tables are unlocked at the close of the blowing operation, the reversal of pressure in the pipes 134 and 135 will lift the blowheads and shut off further supply of blowing air through them. While this clamping and blowing operation is taking effect, air from the line 135 passes to the lift pin cylinder 114 to raise it, and thence through the grooved piston rod 112 and pipe 146 to the lower end of the take-out cylinder 107 to raise the take-out tongs and remove the ware from the open mold; and upon completion of the lifting movement, the groove 147 in the lower end of the piston rod 105 admits air through the hollow piston rod 111 to the cylinder 109 and moves the piston 107 laterally to position the suspended ware over the conveyor 102. The reversal of pressure in the air pipes 134 and 135 at the end of the table turning movement causes air from the line 134 to pass to the upper end of the cylinder 107 and lower the piston 105, which releases the ware upon the conveyor.

The conveyor 102 (see Fig. 1) may be of the link belt or other suitable form, and preferably is operated by means of a ratchet wheel 148 (see Fig. 4) that is attached to one of the belt carrying pulleys and is engaged by a pawl on an oscillating lever 148ª. The conveyor is operated with a step by step movement by the air cylinder 138 and piston, the piston rod 149 being connected to the lever 148ª by a pin working in a slot in the lever, or other suitable connection. A screw 150 in the end of the cylinder 138 enables the stroke of the piston to the adjusted to the length of travel of the conveyor desired for the size of ware being manufactured.

During the time that the tables are locked by the locking pins 25 and 26, the conveyor actuating mechanism is being returned to normal position, shown at the lower left hand side of Fig. 4, by air from the pipe 135, as heretofore described. An adjustable check valve 151 is provided for the pipe 137, which connects the head end of the cylinder with the pipe 135, for choking the exhaust and thereby controlling the speed of the working stroke of the conveyor operating devices; and a stop cock 152 is arranged in the pipe 139 which connects the outer end of the cylinder 138 with the pipe 134 whereby the speed of returning the conveyor actuating mechanism may be controlled.

When the locking pins 25 and 26 are released from engagement with the tables, air is admitted into pipe 134 passing to pipe 139 to move the piston toward the head end of the cylinder 138, thereby moving the conveyor forward. This operation may be timed to follow the releasing of the ware on the conveyor by the cylinder 107, which is also operated by air from the pipe 134, in order to make room for the next bottle deposited thereon by the take-out mechanism.

The transfer operating cylinder and the cylinder 109 for laterally moving the take-out device, are returned to their normal positions during the rotation of the tables by air pressure admitted from the main M by the valve 152 through the pipe 153, as shown in Fig. 4. This valve is moved by one of a series of cams 154 carried by the blow table 11, each being mounted between the positions of the adjacent mold carrying brackets, so as to operate the valve 152 while the table is running. A slot 155 in the piston rod 105 permits the air to exhaust from the head end of the cylinder 109 during the return movement of the take-out device, and thereby this return movement is prevented if the piston 106 has not lowered so as to release the ware.

The manner of production of the parison is illustrated in Figs. 5, 6 and 7. The gob of glass G cut off by the feeder or other suitable shearing mechanism has an upper hot shear mark S' and a lower cold shear mark S², the latter being formed during the preceding charging operation (see Fig. 5). The portion of the gob around the lower shear mark S² is somewhat chilled and is not as plastic as the hotter parts, and heretofore it has been difficult to prevent it from scarring the finished tumbler bottom. By my invention this portion is caused to form the neck or bust-off portion, and is discarded and cannot cause a blemish in the finished ware.

The gob is delivered to the blank molds 37 and associated neck rings 38 with the neck rings lowermost, as shown in Fig. 5. The neck forming pin 78 is fitted within the neck rings and thereby closes the lower end of the blank mold. Following the charging of the glass gob to the blank mold, the blowhead 82 at the blow down station is positioned to engage the open upper end of the mold and admit air under pressure directly to the glass and compress it around the neck pin thereby to form the neck finish on the parison, as is shown in Fig. 6. The upper shear mark S' is somewhat smoothed out in this operation.

Following this operation the blank mold is moved to the blank or parison blowing station, and during its travel it is inverted to present the neck rings uppermost. At the parison blowing station (see Fig. 7) the baffle plate 99, carried on a piston rod operating in the cylinder 101, is then moved into engagement with the lower end of the blank mold to close it and another blowhead 82 is positioned above the mold to admit air through the neck rings to blow the parison to desired form. The baffle plate 99 forms the bottom and lower edge of the side walls of the parison, and the parting line between it and the mold bottom edges is high enough so as to come in the edge of the blown tumbler blank and avoid a blemish on the bottom of the finished ware.

The blank mold is then moved to the transfer station where the blank is suspended directly above the body portion 39 of the blow mold, the bust-off rings thereof being open, as shown in Fig. 8, with the bottom of the blank just clearing the top of the blow mold section 39. At this time the blank mold sections 37 are opened by the movable finger 55 described above, to suspend the blank by the neck rings, and the bust-off rings 41 are closed by the movable fork 71. As the mechanism for closing the bust-off rings completes its operation, the yoke 62 is operated to relieve the neck rings 38, permitting the parison to drop into the blow mold, where it is suspended by the neck finish engaging the "bust-off" ring 41, as shown in Fig. 9. The parison is allowed to "soak" in the blow molds for a series of operations to soften the chilled skin formed in the blank molds, and is then blown at the blowing station to the shape desired for cracking.

The ware produced in accordance with the method and machine described above is substantially of the shape shown in Fig. 10, and is free from blemishes in the portion which forms the tumbler. This ware is then passed through a lehr (not shown) and after annealing, preferably while cold, the top or neck portion is cracked off along a line 156 slightly below the shoulder. The cylindrical body remaining is then ground and fire-finished to smooth the edge as is a common practice in the manufacture of tumblers. A suitable machine for cracking off the tops and finishing the edges of blown tumblers is shown in Patent No. 622,457, granted April 4, 1899, to J. B. Fondu, for manufacture of tumblers, glasses, vases, etc.

The invention is not restricted to the details of the construction shown or the method described; nor is it restricted to the manufacture of tumblers, but is applicable to the methods and apparatus for making other glass articles.

What I claim and desire to secure by Letters Patent is:

1. In a glass ware forming machine of the character described, the combination of movable blank and blow molds, the blank molds comprising separable mating body and neck portions, adapted to receive the sheared gather and initially form the blank in inverted position and the blow molds comprising a seamless body and separable mating neck or "bust-off" portions, means for moving said molds to successive operating stations including a transfer station, means for automatically disengaging the body portion of the parison mold from said parison at the transfer station, thereby to suspend the parison by the neck portions, means for moving the blow mold into cooperative position with respect to the suspended parison at the transfer station, and means to disengage the neck portion of the parison mold from the parison to permit it to be received by the blow mold.

2. In a glass ware forming machine of the character described, the combination of movable blank and blow molds, the blank molds comprising separable mating body and neck portions adapted to receive the sheared gather and initially form the blank in inverted position, and the blow molds comprising a seamless body and separable mating neck or bust-off portions, means for moving said molds to successive operating stations including a transfer station, means for automatically disengaging the body portion of the parison mold from said parison at the transfer station, thereby to suspend the parison by the neck portions, means for moving the blow molds into cooperative position with respect to the suspended blank at the transfer station with the bust-off sections open, means for closing the bust-off sections, and means for releasing the neck portions of the parison mold from the parison to permit it to be received by the "bust-off" section.

3. In a glassware forming machine of the character described, the combination of separable blank molds and solid blow molds movable to successive operating stations including a transfer station, said blank and blow molds being so positioned that the blank mold is directly above the blow mold at the transfer station, separable neck rings associated with said blank molds, separable bust-off rings associated with said blow molds, said blow mold having its bust-off rings open at the transfer station, means for disengaging the blank mold from the blank, means for closing the bust-off rings over the upper end of the blow mold, and means for disengaging the neck rings from said blank to permit the latter to drop into said blow mold and be engaged by said bust-off rings.

4. In a glassware forming machine of the character described, the combination of separable blank molds and solid blow molds movable to successive operating stations including a transfer station, separable neck rings associated with said blank molds, separable bust-off rings associated with said blow molds, said blank and blow molds being so positioned that the blank mold is directly above the blow mold at the transfer station to permit the blank to be dropped into the blow mold and be supported by the bust-off ring, said blow mold arriving at the transfer station with the bust-off rings opened, means for disengaging the blank mold from the blank, means for closing the bust-off rings over the upper end of the blow mold, and means for disengaging the neck rings from said blank.

5. Means for transferring glass parisons from a blank mold to a solid blow mold which are movable to a position where their vertical axes coincide, comprising means for disengaging the blank mold from the blank, means adapted to engage the finish of the parison and support it above the blow mold after the blank mold has been disengaged therefrom, and means for disengaging said last named means from said parison to permit it to fall into the blow mold.

6. Means for transferring glass parisons from a blank mold to a solid blow mold which are movable to a position where their vertical axes coincide, comprising means for disengaging the blank mold from the blank, means engaging the finish of the parison for supporting the free parison above and clear of the blow mold, and means for disengaging the last named means from the parison to drop it into the blow mold.

7. Means for transferring glass parisons from a blank mold to a solid blow mold, which are movable to a position where their vertical axes coincide, comprising means for disengaging the blank mold from the blank, neck rings engaging the finish of the parison for supporting the free parison above and clear of the blow mold, neck rings associated with the upper end of the blow mold, and means for disengaging the neck rings from the parison to drop it into the neck rings associated with the blow mold.

8. In a glassware forming machine of the character described, the combination of movable blank and blow molds, the blank molds comprising separable mating body and neck portions adapted to receive the sheared gather and initially form the blank in inverted position, and the blow molds comprising a seamless body and separable mating neck or bust-off portions, means for moving said molds to a transfer position, means for automatically disengaging the body portion of the parison mold from said parison thereby to suspend the parison by the neck portions, means for moving the blow mold into cooperative position with respect to the suspended blank at the transfer station with the bust-off sections open, means for closing the bust-off sections, and means for releasing the neck portions of the parison mold from the parison to cause it to be received by the "bust-off" section.

9. Apparatus for forming seamless blown tumbler blanks comprising parison molds having separable mating body blank and sectional mating neck portions; blow molds having a seamless body portion and separable neck or bust-off portions, said parison and blow molds being adapted for successive action upon the glass charge, means for shaping the glass charge in the parison mold comprising means first to apply differential fluid pressure on the opposite ends of the charge to compact the charge, and then to admit air under pressure to one end of the charge to blow the charge to hollow form to form a hollow parison, means for transferring the parison from the parison mold to the blow mold comprising means for automatically disengaging the body blank mold portions from the parison to expose the parison and suspend it from the neck mold portions, means for closing the neck or bust-off portions of the blow mold over the seamless body portion thereof, and means for releasing the neck mold sections of the parison mold from the parison to cause the parison to be received axially into the neck and body portions of the blow mold.

10. Apparatus for forming seamless blown tumbler blanks comprising parison molds having separable mating body blank and sectional mating neck portions; blow molds having a seamless body portion and separable neck or bust-off portions, said parison and blow molds being adapted for successive action upon the glass charge, means for shaping the glass charge in the parison mold comprising means first to apply differential fluid pressure on the opposite ends of the charge with the parison mold in inverted position to compact the charge, and then to admit air under pressure to one end of the charge to blow the charge to hollow form to form a hollow parison, means for transferring the parison from the parison mold to the blow mold comprising means for automatically disengaging the body blank mold portions from the parison to expose the parison and suspend it from the neck mold portions, means for closing the neck or bust-off portions of the blow mold over the seamless body portion thereof, and means for releasing the neck mold sections of the parison mold from the parison to cause the parison to be received axially into the neck and body portions of the blow mold.

11. Apparatus for forming seamless blown tumblers and like blanks comprising a circular series of parison molds and a circular series of blow molds adapted for successive action on the glass charge, laterally spaced rotatable carriers for the respective molds, said parison molds comprising separable mating body blank sections and cooperating mating neck mold sections, said blow mold comprising a seamless body portion and cooperating separable mating or bust-off sections, means for shaping the glass charge in the parison mold including means first to apply differential air pressure on opposite ends of the charge to compact the same and later to admit air under pressure to one end of the charge to blow the charge to hollow form and form a hollow parison, means to rotate said mold carriers in unison to bring the respective parison and blow molds towards each other until they register about a common vertical axis so that the respective neck molds thereof coincide in axial alignment, means to disengage the body blank mold sections from the parison to expose the parison supported by the parison neck mold sections, means to close the neck mold sections of the adjacent blow mold around the lower portion of the suspended parison, and means to then release the neck mold sections of the parison mold to release the parison.

12. Apparatus for forming seamless blown tumbler blanks, a series of parison molds comprising separable mating body blank portions and cooperable sectional mating neck portions, a rotatable carrier therefor, a series of blow molds comprising seamless body portions and cooperating separable mating neck or bust-off portions, a rotatable carrier for said blow molds laterally spaced from said parison mold carrier, said parison and blow molds being adapted for successive action upon the glass charge, means for shaping the glass charge in the parison mold including means first to apply differential air pressure on opposite ends of the charge to compact the same, and later to admit air under pressure to one end of the charge to blow the charge to hollow form and form a hollow parison, means to disengage the body blank mold sections from the parison and expose it supported by the parison neck mold portions, means for moving said carriers to bring the respective parison and blow molds towards each other so that the respective neck molds thereof are in axial alignment at a single intersecting point along the center line of said mold carriers, means to close the neck mold sections of the blow molds, and means to then release the neck mold sections of the parison mold to cause the parison to be received axially into the neck and seamless body portion of the blow molds.

13. In a glassware forming machine, a blank mold having separable mating body blank and cooperative sectional mating neck mold portions, a blow mold having a seamless body portion and cooperative sectional neck or bust-off portions axially fixed with reference to the body portion thereof, means for moving said molds to position where their axes coincide, means for transferring the parisons from the blank mold to the blow mold, comprising means for disengaging the body blank mold from the parison whereby to support the parison from the neck mold portions thereof, means for disengaging the neck mold sections of the parison mold from the parison to drop it into the neck and body mold sections of the blow mold.

In testimony whereof, I have signed my name to this specification.

JAMES W. LYNCH.